(12) United States Patent
Tan

(10) Patent No.: US 8,127,643 B1
(45) Date of Patent: Mar. 6, 2012

(54) METHODS, DEVICES AND SYSTEMS FOR SCREW FEEDING BY VACUUM AND GRAVITY

(75) Inventor: Jit Han Tan, Petaling Jaya (MY)

(73) Assignee: Western Digital Technologies, Inc., Irvine, CA (US)

(*) Notice: Subject to any disclaimer, the term of this patent is extended or adjusted under 35 U.S.C. 154(b) by 0 days.

(21) Appl. No.: 13/164,259

(22) Filed: Jun. 20, 2011

Related U.S. Application Data

(60) Division of application No. 11/605,754, filed on Nov. 29, 2006, now Pat. No. 7,980,159, which is a continuation-in-part of application No. 11/289,847, filed on Nov. 30, 2005, now Pat. No. 7,178,432.

(51) Int. Cl.
*B25B 23/04* (2006.01)
*B25B 23/08* (2006.01)

(52) U.S. Cl. .................................. 81/430; 81/57.37

(58) Field of Classification Search ............. 81/52, 54, 81/57.37, 430, 431
See application file for complete search history.

(56) References Cited

U.S. PATENT DOCUMENTS

| | | | |
|---|---|---|---|
| 2,273,268 A | 2/1942 | Hunter et al. |
| 2,314,760 A | 3/1943 | Walter |
| 2,657,721 A | 3/1953 | Shaff |
| 3,275,047 A | 9/1966 | Kulman |
| 3,583,451 A | 6/1971 | Dixon et al. |
| 3,680,194 A | 8/1972 | Monaghan et al. |
| 4,495,841 A | 1/1985 | Mori et al. |
| 4,627,316 A | 12/1986 | Mori et al. |
| 4,669,359 A | 6/1987 | Shiba |
| 4,790,234 A | 12/1988 | Hampejs et al. |
| 4,800,325 A | 1/1989 | Nakanishi |
| 4,813,312 A | 3/1989 | Wilhelm |
| 4,881,435 A | 11/1989 | Hansson |
| 4,908,926 A | 3/1990 | Takeshima et al. |
| 4,922,436 A | 5/1990 | Dohm et al. |
| 4,924,732 A | 5/1990 | Hoskins et al. |
| 4,955,476 A | 9/1990 | Nakata et al. |
| 5,010,286 A | 4/1991 | Nakamura et al. |
| 5,019,763 A | 5/1991 | Komatsu |
| 5,059,089 A | 10/1991 | Kocaoglan |
| 5,090,103 A | 2/1992 | Nakata et al. |
| 5,121,558 A | 6/1992 | Caroe et al. |
| 5,154,242 A | 10/1992 | Soshin et al. |
| 5,170,852 A | 12/1992 | Shikata et al. |

(Continued)

OTHER PUBLICATIONS

Microtec Systems, "Microdrive G4, Screwdriver System User's Manual", Microtech Systems GmbH, Ver.0.93, Nov. 11, 2005, pp. 1-35.

(Continued)

*Primary Examiner* — David B Thomas

(57) ABSTRACT

An electric screwdriver assembly includes a body portion, a screwdriver and a vacuum coupling assembly. The body portion defines a screw conduit therethrough which has a distal end and at least one opening spaced apart from the distal end. The screwdriver is disposed within the body portion and includes a free end facing the distal end of the screw conduit that defines a screwdriver bit. The screwdriver bit is moveable through the screw conduit between a position proximal from the opening and a position distal from the opening. The vacuum coupling assembly is configured to couple to a vacuum generator to the body portion in order to generate a partial vacuum within the screw conduit through the opening to substantially align the screw with the at least one opening.

13 Claims, 14 Drawing Sheets

U.S. PATENT DOCUMENTS

| | | |
|---|---|---|
| 5,186,084 A | 2/1993 | Totsu |
| 5,215,270 A | 6/1993 | Udocon et al. |
| 5,270,625 A | 12/1993 | Neff |
| 5,289,886 A | 3/1994 | Shikata et al. |
| 5,345,766 A | 9/1994 | Leonhartsberger et al. |
| 5,359,269 A | 10/1994 | Wedeen et al. |
| 5,480,087 A | 1/1996 | Young et al. |
| 5,511,933 A | 4/1996 | Herklotz |
| 5,549,169 A | 8/1996 | Matsumura et al. |
| 5,631,823 A | 5/1997 | Layer et al. |
| 5,631,852 A | 5/1997 | Chen |
| 5,708,586 A | 1/1998 | Ikeda |
| 5,839,332 A | 11/1998 | Fujiyama et al. |
| 6,086,292 A | 7/2000 | Yokoyama |
| 6,247,387 B1 | 6/2001 | Ketteringham |
| 6,418,818 B1 | 7/2002 | Tham et al. |
| 6,497,036 B1 | 12/2002 | Jenkins et al. |
| 6,543,119 B2 | 4/2003 | Jenkins et al. |
| 6,680,595 B2 | 1/2004 | Ito |
| 6,681,659 B2 | 1/2004 | Hoe et al. |
| 6,701,212 B2 | 3/2004 | Shiba et al. |
| 6,840,929 B2 | 1/2005 | Kurata |
| 6,945,140 B2 | 9/2005 | Gibbons et al. |
| 7,077,621 B2 | 7/2006 | Ruden |
| 7,178,432 B1 | 2/2007 | Han et al. |
| 7,400,106 B2 | 7/2008 | DeCicco et al. |
| 7,458,282 B1 | 12/2008 | Wuester, Sr. et al. |
| 7,506,553 B1 | 3/2009 | Panyavoravaj |
| 7,549,204 B1 * | 6/2009 | Vangal-Ramamurthy et al. .................. 29/407.02 |
| 2001/0035087 A1 | 11/2001 | Subotnick |
| 2005/0039580 A1 | 2/2005 | Gibbons et al. |
| 2005/0196264 A1 | 9/2005 | Ruden |

OTHER PUBLICATIONS

Microtec Systems, "Components and Systems for Total Process Controlled Screw Tightening", Microtec Systems Torque Competence, 2005/2006, pp. 1-30.

Notice of Allowance dated Feb. 16, 2006 from U.S. Appl. No. 11/289,847, 3 pages.

Interview Summary dated Nov. 19, 2010 from U.S. Appl. No. 11/605,754, 3 page.

Notice of Allowance dated Mar. 31, 2011 from U.S. Appl. No. 11/605,754, 7 pages

Office Action dated Mar. 29, 2010 from U.S. Appl. No. 11/605,754, 6 pages.

Office Action dated Aug. 30, 2010 from U.S. Appl. No. 11/605,754, 7 pages.

Office Action dated Dec. 29, 2010 from U.S. Appl. No. 11/605,754, 5 pages.

Office Action dated Nov. 10, 2009 from U.S. Appl. No. 11/605,754, 8 pages.

* cited by examiner

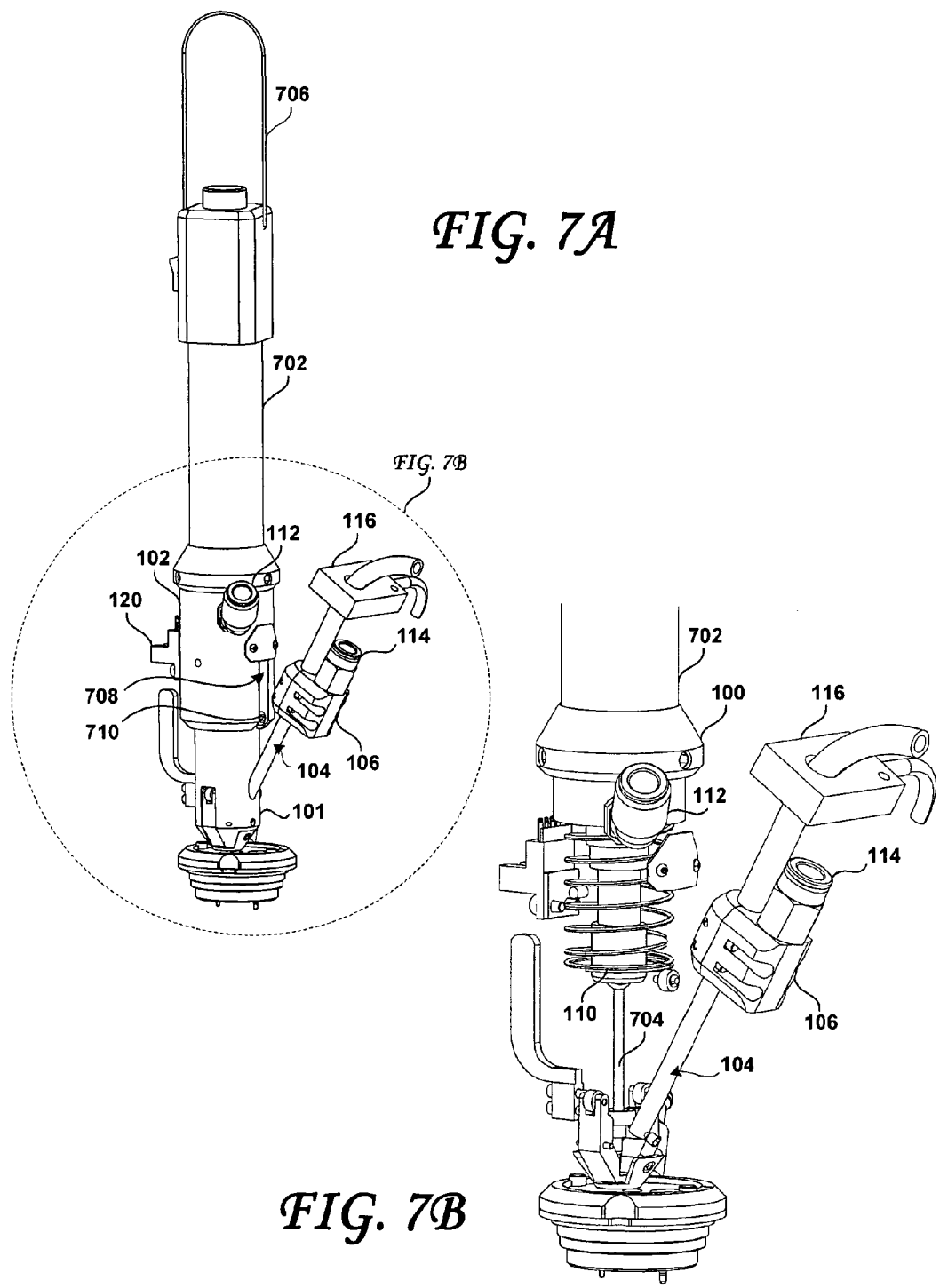

METHODS, DEVICES AND SYSTEMS FOR SCREW FEEDING BY VACUUM AND GRAVITY

CROSS-REFERENCE TO RELATED APPLICATIONS

This application is a divisional of U.S. application Ser. No. 11/605,754, filed Nov. 29, 2006 which is a continuation-in-part of U.S. application Ser. No. 11/289,847, filed Nov. 30, 2005, the content of which is hereby incorporated in its entirety.

BACKGROUND OF THE INVENTION

1. Field of the Invention

The present invention relates generally to screwdrivers, and in particular to methods, devices and systems for feeding screws automatically to an electric screwdriver.

2. Description of the Related Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base.

Advances in the hard disk drive industry have led to the incorporation of disk drives into a variety of hand held devices, such as music players, cameras and PDAs. The small size of such devices has led to a corresponding reduction in the form factor of high capacity hard disk drives. Conversely, the ability of manufacturers to introduce ever smaller drives has led to their incorporation in ever widening classes of electronic devices and to the development of entirely new classes of devices. Form factors have steadily shrunk from 5.25", 3.5", 2.5", 1.8" and now to 1 inch and smaller drives.

As a result of such continuing miniaturization, many of the constituent components of the drives have become too small to be consistently, speedily and reliably handled by human hands. For example, screws that are used in such small form factor drives include so-called M1 screws, which have a diameter of just 1 mm and a head height of just 0.2 mm. These screws are difficult to pick up, couple to a screwdriver and drive into a selected threaded hole in a disk drive. Such problems have led to the development of electric screw driving machines. Many existing electric screwdrivers in the factory require the operator to manually or vacuum pick the screws from a shaker tray before driving them on designated fixtures. That is, before driving a screw, the operator must swing the electric screwdriver over to the shaker tray. After the electric screwdriver is in position over the shaker tray, the operator must cause a screw to couple to the bit of the electric screwdriver and swing the electric screwdriver and coupled screw in position over the disk drive to drive the screw therein. After the screw has been driven, the operator must once again swing the electric screwdriver over the shaker tray to couple another screw to the electric screwdriver. The repetitive process of swinging the electric screwdriver over the shaker tray, picking up a screw and swinging the screwdriver back over the disk drive (which is sometimes called a "pick-and-place" process) is time consuming (and, therefore, decreases the manufacturing line's yield). Improving upon the conventional method of picking up screws from a shaker tray would decrease the screw driving cycle time, as well as operator fatigue.

Electric screwdrivers with automatic screw feeding systems do exist, but typically rely on a blow feed system to feed the screws to the screwdriver. Such blow feed systems use a blast of air to carry the screw from its source to a position in which it may be engaged by the screwdriver's bit. This blast of air typically escapes from the screwdriver in the vicinity of the screwdriver's bit and may carry particulate matter and other contaminants to the work area. Electric screwdrivers featuring blow feed systems are, therefore, unsuitable for environments in which it is desired to minimize such contamination, such as clean room environments, for example. What are needed, therefore, are electric screwdrivers having automatic screw feeding mechanisms that are suitable for use in clean room environments and other environments in which it is desired to minimize contamination.

BRIEF DESCRIPTION OF THE DRAWINGS

FIG. 7A shows an electric screwdriver with automatic screw feeding functionality, according to another embodiment of the present invention.

FIG. 7B shows a detail view of a portion of the electric screwdriver of FIG. 7A, with the first and second body portions removed therefrom, to show selected internal structures thereof.

DESCRIPTION OF THE PREFERRED EMBODIMENTS

Figure 1:
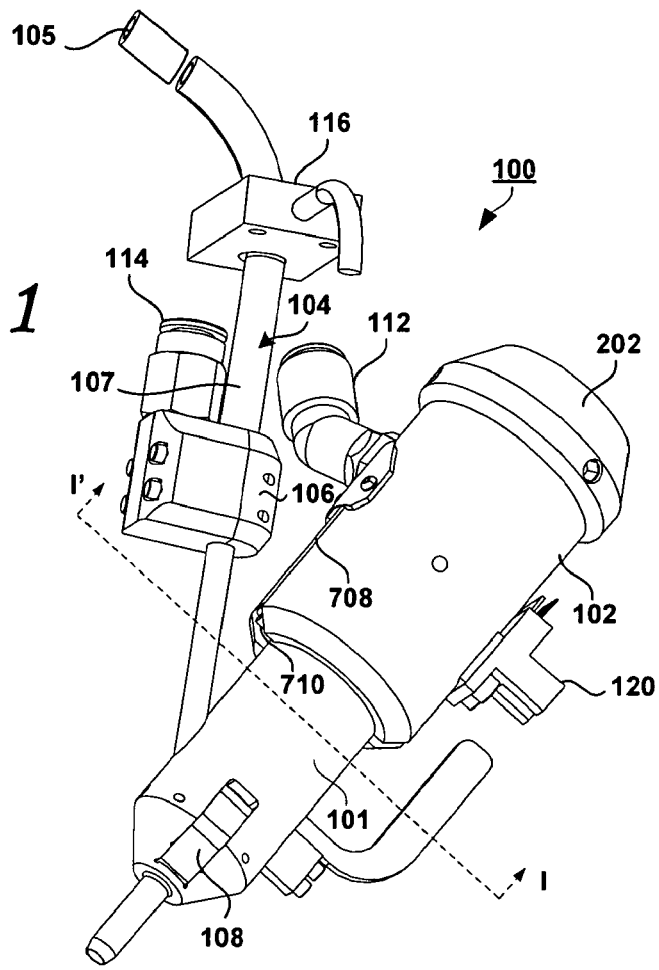
FIG. 1 shows an adaptor for feeding screws to an electric screwdriver, according to an embodiment of the present invention.
Figure 2:
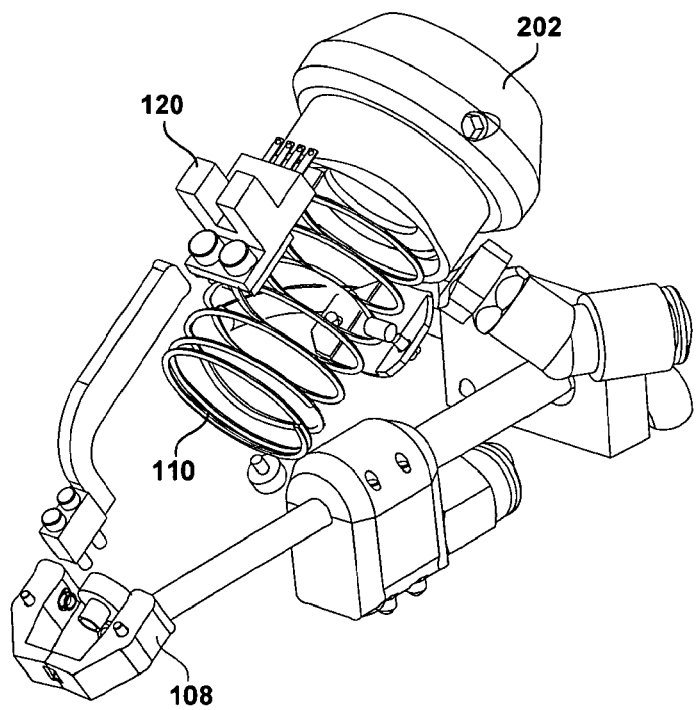
FIG. 2 shows the adaptor for feeding screws of FIG. 1 with the first and second body portions removed therefrom, to show some of the internal structure thereof.
Figure 3:
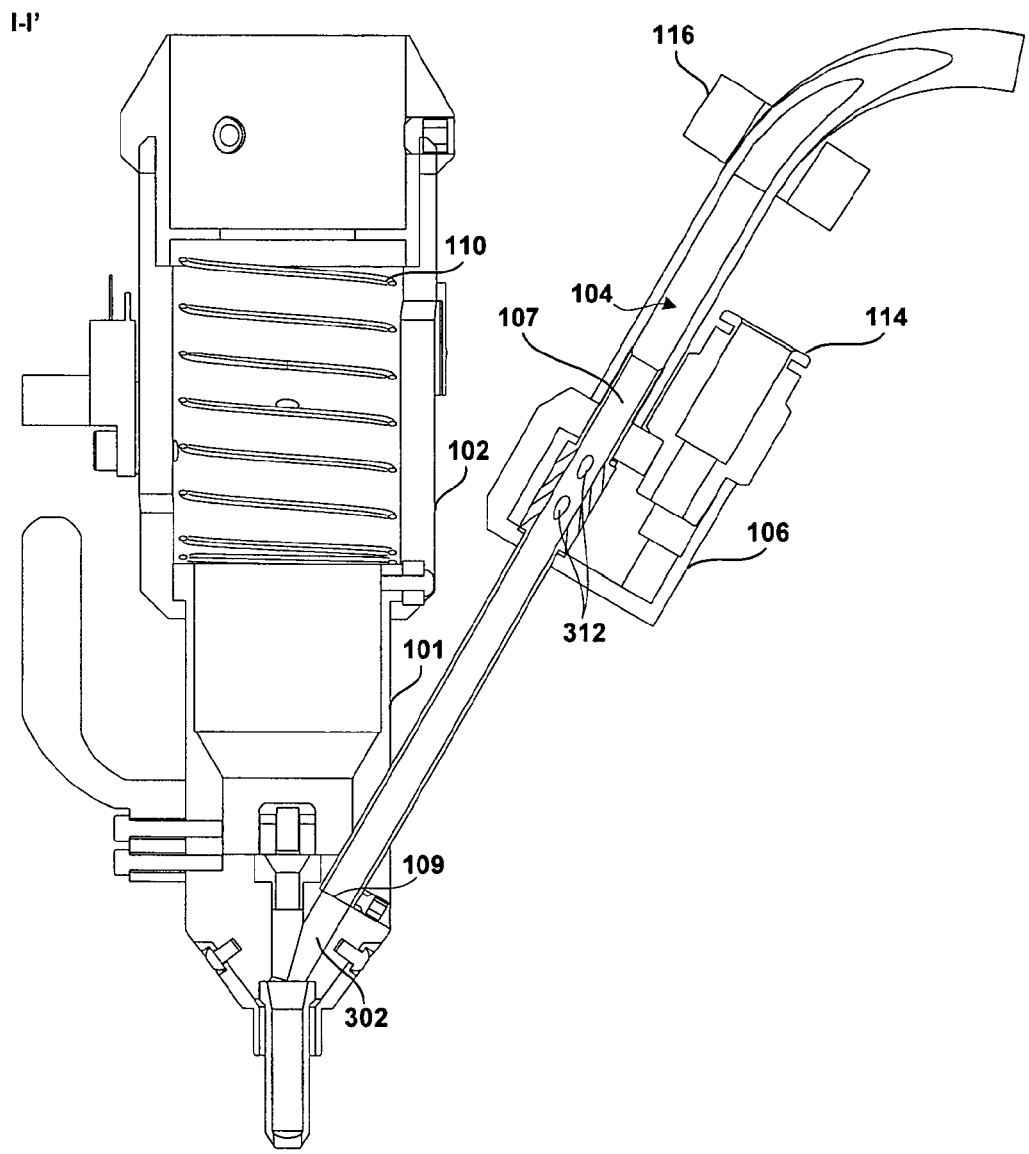
FIG. 3 shows a cross-sectional view of the adaptor of FIG. 1, taken along lines I-I' of FIG. 1.

FIG. 1 shows an adaptor 100 for feeding screws to an electric screwdriver, according to an embodiment of the present invention. FIG. 2 shows the adaptor 100, with body portions removed therefrom, to show selected internal structures thereof, and FIG. 3 is a cross-sectional view of the adaptor 100 taken along lines I-I' of FIG. 1. Considering now FIGS. 1, 2 and 3 collectively, the adaptor 100 is configured to couple to an electric screwdriver (shown in FIGS. 7A and 7B) and may include a first body portion 101 and a second body portion 102. Embodiments of adaptors constructed according to embodiments of the present invention may be configured to couple to electric screwdrivers manufactured by, for example, Hiyashi or Delvo. The first body portion 101 of the adaptor 100 may define a screw conduit, shown at 302 in FIG. 3. According to an embodiment of the present invention, when the adaptor 100 is in use, the screw conduit 302 is preferably in an orientation to enable screws to pass therethrough under the force of gravity alone. As would be well understood by those of skill in the art, more or fewer body portions may be used to construct the adaptor 100 according to embodiments of the present invention. Moreover, although described in terms of separately constructed pieces, many of the pieces described herein may be formed as a unitary construction according to other embodiments.

A screw feeder tube 104 (formed of polyurethane, for example) may be coupled to the first body portion 101. Advantageously, all or selected portions of the screw feeder tube 104 may be partially transparent, to enable the operator to see the screw as it travels through the screw feeder tube 104. The screw feeder tube 104 may define a proximal end 105, a middle region 107 and a distal end 109. The proximal end 105 may be coupled to a source of screws and may be configured to receive screws. The distal end 109 of the screw feeder tube 104 may be coupled to the first body portion 101 and to the screw conduit 302. According to an embodiment of the present invention, at least a distal portion of the screw feeder tube 104 defined between the middle region 107 and distal end 109 may be oriented generally vertically, so as to enable screws to pass therethrough under the force of gravity. As used herein, the phrase, generally vertically, may be contrasted with a horizontal orientation, wherein a screw would be unable to move through the tube 104 under the force of gravity, and does not imply a perfectly vertical orientation. As would be well understood by those skilled in the art, the screw feeder tube 104 may be made of any suitable material and is preferably sized to allow a single screw to closely fit therethrough.

A vacuum generator (not shown) may be coupled to the middle region 107 of the screw feeder tube 104 by a vacuum coupler (for example, by a vacuum bracket 106) disposed adjacent the middle region 107 of the screw feeder tube 104. The vacuum generator (which forms no part of the embodiments of the present invention described herein) may be configured to selectively generate a vacuum within the screw feeder tube 104 that is sufficient to draw a screw from the proximal end 105 (shown in FIG. 1) of the screw feeder tube 104 to the middle region 107 thereof. It has been found that the screw feeder tube and the vacuum generator may be configured such that a screw may travel through a 0.5 m length of the screw feeder tube 104 in less than 0.5 seconds. The vacuum generator may comprise any type of vacuum generator well known to those of skill in the art, and may provide vacuum via many vacuum hoses to a number of different devices.

After the screw reaches the middle region 107 of the screw feeder tube 104, the vacuum may be shut off, enabling the screw to travel (preferably under the force of gravity alone) to the distal end 109 of the screw feeder tube 104. Having reached the distal end 109 of the screw feeder tube 104, the screw may then enter the screw conduit 302. As the screw conduit 302 is preferably oriented such that the screw may travel therethrough under the force of gravity alone when the adaptor or the electric screwdriver is in use, the screw may fall to a screw holding assembly 108 that is adjacent the screw conduit 302. In a preferred embodiment, the screw holding assembly may be coupled to the screw conduit 302. The screw holding assembly 108, according to an embodiment of the present invention, may be configured to receive and hold the screw in a position for engagement by the electric screwdriver.

According to one embodiment of the present invention, the screwdriver (shown at 702 in FIGS. 7A and 7B) may be coupled to the adaptor 100. Alternatively, the adaptor 100 may form an integral part of the electric screwdriver 702. In the embodiment shown in FIG. 1, the electric screwdriver is coupled to the adaptor, and, in particular, is coupled to the second body portion 102. The first and second body portions 101, 102 may be configured to slide relative to one another, as the screwdriver bit is driven forward and backward. At least the second body portion may include an outer member formed of Aluminum (for example) and an inner member formed of, for example, Turcite®, an internally lubricated, low water absorption material that is suitable for applications having exacting wear and friction requirements. Other hard plastics such as Pomolux®, for example, may also be used. As best shown in FIG. 7A (but also shown in FIG. 1), the second body portion 102 may define a slot 708, and the first body portion 101 may define a bearing 710 that is aligned with and dimensioned to fit within the slot 708. During operation, as the screwdriver's bit is advanced and retracted, the second body portion 102 may slide over the first body portion 101, guided and facilitated by the aligned and cooperating slot 708 and bearing 710.

FIG. 2 shows the adaptor for feeding screws to an electric screwdriver of FIG. 1, with the first and second body portions 101, 102 removed therefrom, to show some of the internal structure. As shown in both FIGS. 1 and 2, a sleeve 202 may be coupled to the second body portion. The sleeve 202 may be configured to receive the screwdriver and to secure the screwdriver to the adaptor 100 such that the shaft 704 of the screwdriver extends within the adaptor 100. The sleeve 202 may be threaded to enable the adaptor to be tightened onto the screwdriver. Preferably, the threads within the sleeve 202 may be disposed and configured such as to counter the angular force imposed thereon during the screw driving process, to prevent the adaptor from loosening as screws are tightened within the threaded hole of a disk drive, for example.

The adaptor may also be provided with a compression spring 110. Compression spring 110 may be, for example, part number B17-188 available from Century Spring corporation of Los Angeles, Calif. The compression spring 110 may abut the sleeve 202 and may elastically bias the screwdriver in a retracted configuration away from the screw conduit, such that the screwdriver bit 706 (see FIGS. 5B and 5C) is not engaged with the screw 502. An operator (or an automatic system) may then apply (e.g., downwardly directed) pressure on the screwdriver/adaptor assembly to bring the screwdriver bit 706 into engagement with the screw 502 received within the screw holding assembly 108. After the screw 502 has been driven into the disk drive, the operator or automatic system may release the pressure on the screwdriver/adaptor assembly, whereupon the compression spring 110 causes the screwdriver to return to its retracted configuration in which the bit 706 is moved away from the screw holding assembly 108.

The adaptor 100 may also include a vacuum fitting 112 to enable internal cleaning of the adaptor/screwdriver assembly. The vacuum fitting 112 allows the adaptor to be cleaned of any particulates that may have accumulated therein after extended periods of use.

Figure 9:
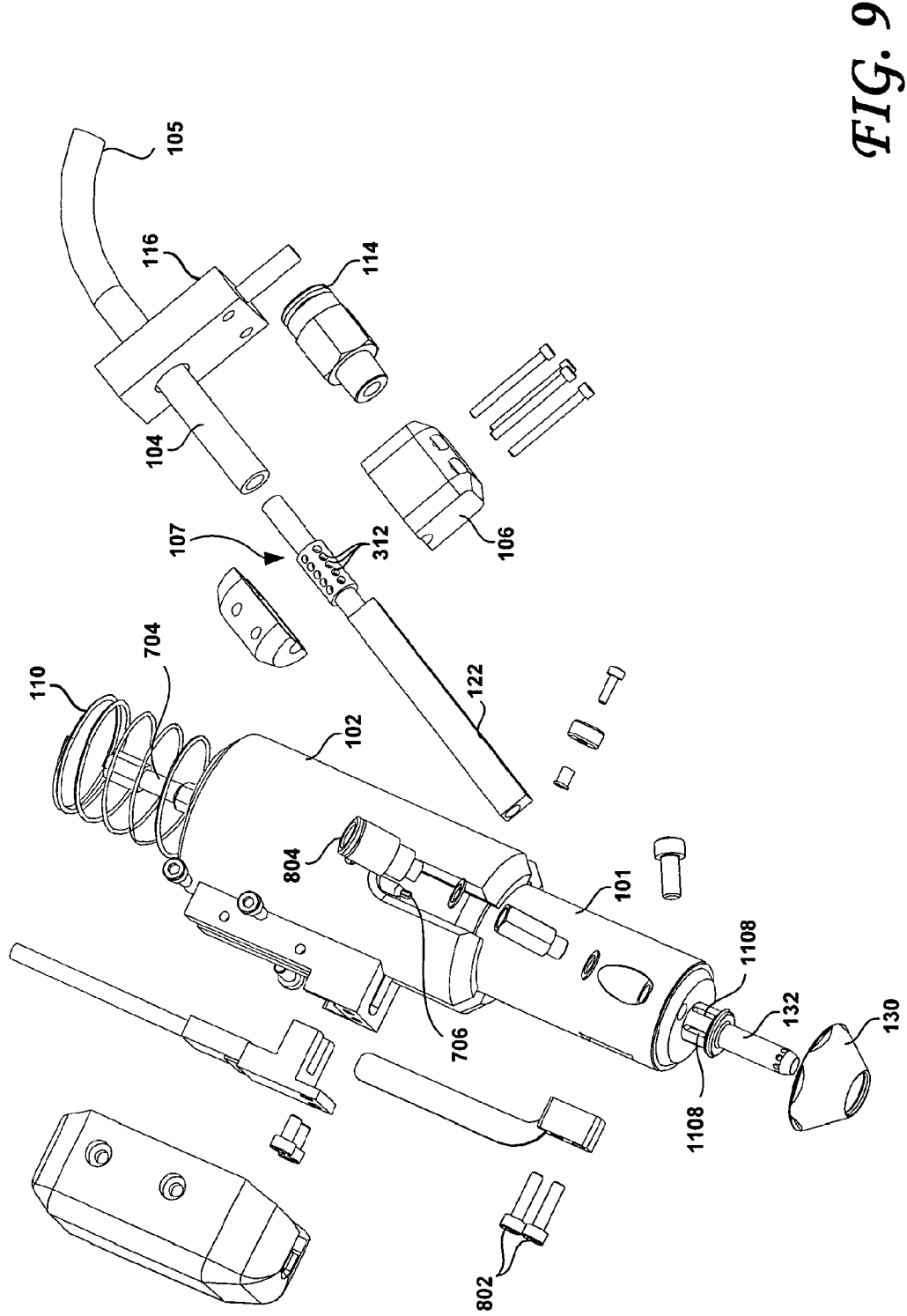
FIG. 9 shows a partially exploded view of the electric screwdriver assembly of FIG. 8.

According to an embodiment of the present invention, the middle region 107 of the screw feeder tube may define one or more perforations 312, as shown in the cross-sectional view of FIG. 3 and in the exploded view of the embodiment shown in FIG. 9. The middle region of the screw feeder tube may be formed of or include, for example, stainless steel such as hardened SST 440C. A vacuum bracket 106 may be fitted to the middle region 107 of the screw feeder tube 104, over the perforations 312. The vacuum bracket 106 preferably forms a substantially air tight seal around the middle region 107 of the screw feeder tube 104. A vacuum bracket fitting 114 may be coupled to the vacuum bracket 106, whereby the adaptor is coupled to the vacuum generator (not shown) via, for example, vacuum tubing. A vacuum may then be created within the screw feeder tube 104 through the perforations 312.

The screw holding assembly 108 may be configured to receive a screw falling within the screw conduit 302 and to receive and hold the screw in a position for engagement by the electric screwdriver. That is, the screw holding assembly 108 may be configured to receive a screw 502 and position the received screw 502 in an upright position, with the head thereof facing the free end of the shaft 704 of the screwdriver 702.

FIGS. 4, 5A, 5B and 5C show an exemplary embodiment of the screw holding assembly 108. As shown therein, the screw holding assembly 108 may include a first screw catchment 402 and a second screw catchment 404. The first and second screw catchments 402, 404 may be provided with a pair of pivot dowels 406, about which they may pivot, as suggested by the arrows 502 in FIG. 5C. The screw holding assembly 108 may be configured to assume a first configuration (shown in FIGS. 4, 5A and 5B) in which the received screw 502 may be received and held and a second configuration (shown in FIG. 5C) in which the first and second screw catchments 402, 404 pivot about their respective pivot dowels 406 and allow the received screw 502 to pass therethrough and then be driven into a corresponding threaded hole by the screwdriver. As shown, the first and second screw catchments 402, 404 may be biased to the first configuration by respective screw catchment springs 408. Suitable screw catchment springs 408 may be obtained from Century Spring Corporation, part number 70058S, for example.

Figure 4:
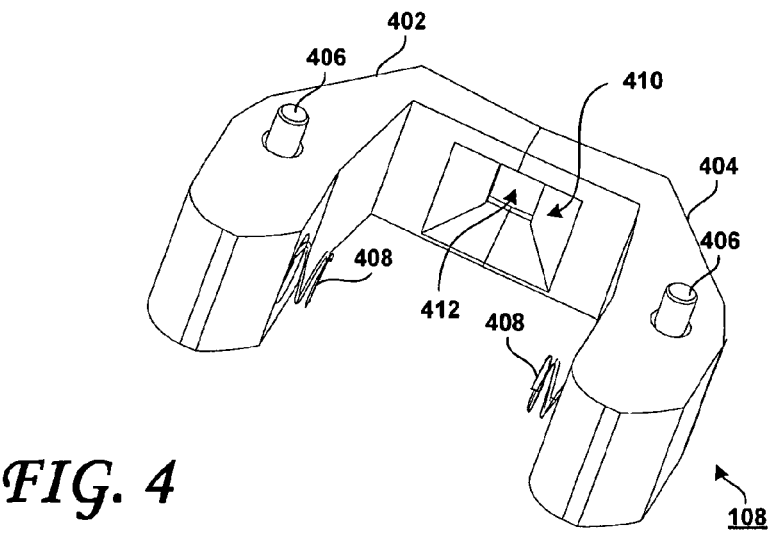
FIG. 4 shows a screw holding assembly according to an embodiment of the present invention.
Figures 5A, 5B, 5C:
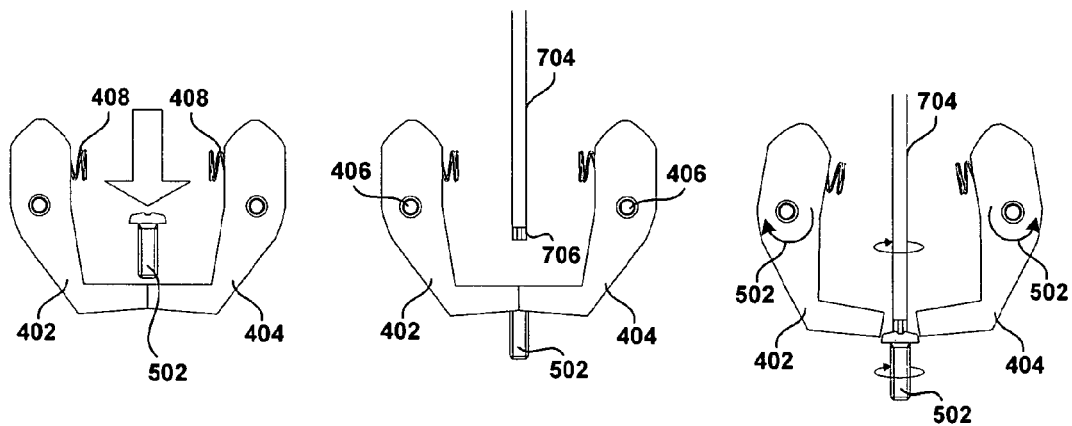
FIG. 5A shows the screw holding assembly of FIG. 4 in a first configuration, to illustrate aspects of the operation thereof.
FIG. 5B shows the screw holding assembly of FIG. 4 in a second configuration, to illustrate further aspects of the operation thereof.
FIG. 5C shows the screw holding assembly of FIG. 4 in a third configuration, to illustrate still further aspects of the operation thereof.

In operation, a screw 502 may be drawn toward the perforations 312 within the middle region 107 of the screw feeder tube 104 by the force of vacuum from a shaker tray, for example, holding a plurality of screws. When the vacuum is turned off or the force thereof sufficiently decreased, the screw 502, no longer held by the vacuum, falls through a distal portion of the screw feeder tube 104 under the force of gravity, toward the distal end 109 of the screw feeder tube. The falling screw 502 may then be received and held by the screw holding assembly 108, which is in its first configuration, as shown in FIGS. 4, 5A and 5B. The screw 502 may rest within the angled depression 410 defined within the screw catchments 402, 404, with the head of the screw 502 being retained therein and the shaft of the screw allowed to extend through an opening 412 defined within the angled depression 410 formed by both screw catchments 402, 404 in the first configuration, as shown in FIG. 5B.

The bit 706 (a Torx® bit, for example) at the free end of the shaft 704 may then be advanced (overcoming the force exerted thereon by the compression spring 110 in the process) toward the head of the screw 502, as shown in FIG. 5B. Thereafter, as shown in FIG. 5C, the bit 706 of the shaft 704 of the screwdriver may engage the screw 502 received within the screw holding assembly 108 and push down on the screw 502. In so doing, the head of the screw 502 may exert a force on the angled surfaces of the angled depression 410, causing the screw catchments 402, 404 to pivot about the pivot dowels 406. As the screw catchments 402, 404 pivot, they release the screw 502, which then may be engaged and driven in an appropriate threaded hole (for example, in a disk drive). After the screw has been driven and the shaft 704 retracted, the screw catchments 402, 404 may return to the first configuration (FIGS. 4, 5A and 5B) under the action of the screw catchment springs 408. Alternatively, as shown, the bit 706 and shaft 704 may have a cross-sectional area smaller than that defined by the opening 412, and the catchments may return to the first configuration after the screw has passed through the opening 412. It is understood that the design and operation of the screw holding assembly 108 may vary from that shown and described herein without, however, departing from the scope of the present invention. For example, in one embodiment, the screw holding assembly 108 may not comprise pivotal members, but its members may instead slide linearly apart upon pressure from the shaft 704.

Figure 6A:
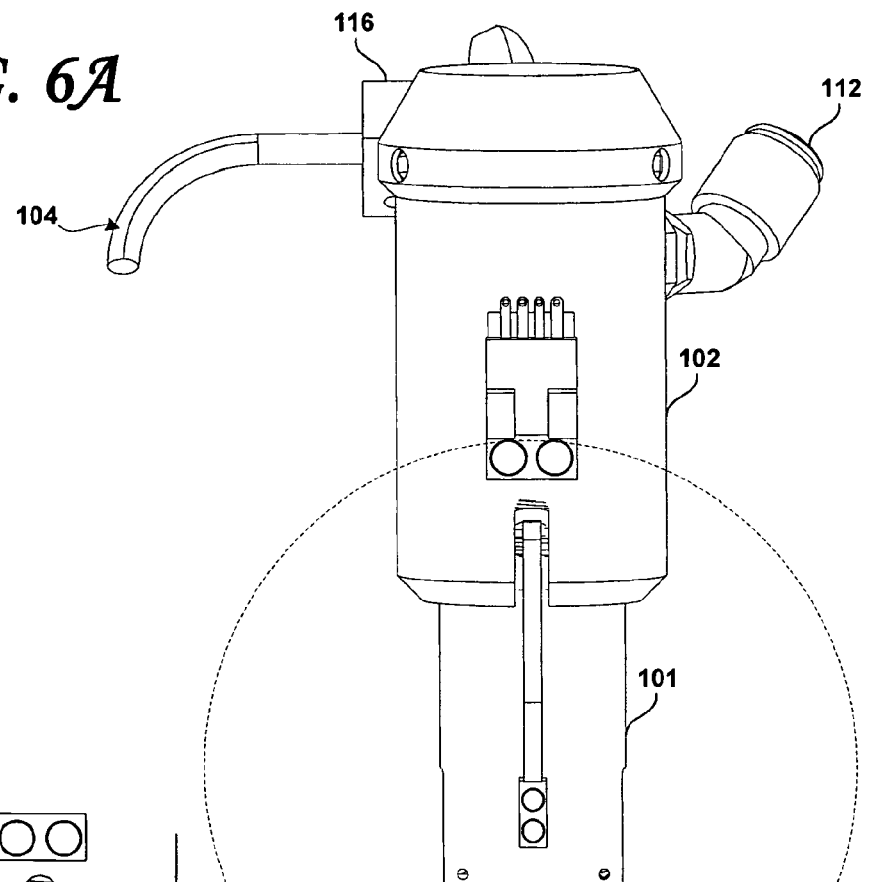
FIG. 6A shows an adaptor for feeding screws to an electric screwdriver, according to another embodiment of the present invention.
Figure 6B:
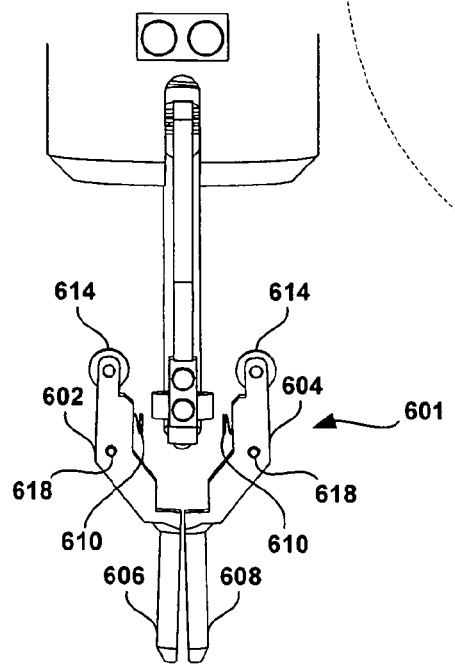
FIG. 6B shows a detail view of a portion of the adaptor of FIG. 6A, with the first body portion removed therefrom, to show selected internal structures thereof.

FIG. 6A shows an adaptor for feeding screws to an electric screwdriver, according to another embodiment of the present invention. FIG. 6B shows a detail view of a portion of the adaptor of FIG. 6A, with the first body portion 101 removed therefrom, to show selected internal structures. FIGS. 6A and 6B show a screw holding assembly 601 of a different design than that shown in FIGS. 1, 4, 5A, 5B and 5C.

As best seen in FIG. 6B, the screw holding assembly 601 may include first and second screw catchments 602, 604. The screw catchments 602, 604 may include screw catchment springs 610 and pivot dowels 618 that operate similarly to their counterpart catchment springs 408 and pivot dowels 406 in FIGS. 4, 5A, 5B and 5C. In addition, this embodiment of the screw holding assembly 601 may include rollers 614, one roller 614 being mounted on each of the screw catchments 602, 604. The rollers 614 facilitate the pivoting of the screw catchments 602, 604 about their respective pivot dowels 618, to enable the screw catchments to smoothly transition between the first configuration in which a received screw is held and the second configuration in which the first and second screw catchments 602, 604 pivot about their respective pivot dowels 618 and allow the received screw to be released and driven by the screwdriver. For example, in one embodiment, a portion of the screwdriver may engage these rollers 614 along an external surface of the body portion as the screw driver lowers towards the captured screw, thus pushing the rollers 614 radially inwards, and pivoting the screw catchments apart at their distal end.

As shown in the embodiment of FIGS. 6A and 6B, each of the screw catchments 602, 604 may include a distal extension 606, 608. Such distal extensions 606, 608 enable the screw to be precisely oriented and aligned with a threaded hole into which the screw is to be driven. That is, when the screw holding assembly 601 assumes its second configuration in which the screw catchments 602, 604 are pivoted about their respective pivot dowels 618 to allow the screw to pass therethrough, and the screw is engaged by the bit of the screwdriver, the distal extensions 606, 608 maintain the engaged screw in the proper orientation while the bit 706 pushes down on the screw to bring the threaded shaft of the screw 502 to the target hole.

The screw holding assemblies 108, 601 are preferably formed of one or more materials having specific properties. For example, the material(s) used for the screw holding assembly 108, 601 preferably should be dimensionally stable after repeated impacts with steel parts. Therefore, Aluminum or polymers (plastics) are not currently preferred, as such material may be too soft to withstand repeated contact with screws without generating unwanted and potentially damaging particulate matter and/or undesirable outgassing. Preferably, the material or materials chosen for the screw holding assembly 108, 601 should be a relatively hard material that is corrosion proof. Accordingly, the screw holding assembly 108, 601 may include hardened SST 440C, as this material satisfies the above-outlined criteria and effectively withstands repeated impacts and contact with the screw heads.

According to an embodiment of the present invention, after a screw has been released from the middle region 107 (by shutting off the suction, for example) and falls (through the force of gravity, for example) within the screw conduit 302 to be received and held by the screw holding assembly 108 or 601, a new screw may be drawn into the screw feeder tube 104 and held at the perforations 312 defined within the middle region 107. That is, after a first screw has been released to the screw holding assembly 108 or 601, a second screw may be drawn into the screw feeder tube 104 and held at the perforations 312 at least until the bit 706 of the screwdriver has finished driving the first screw and retracted sufficiently to clear the screw holding assembly 108 or 601. Having a screw "on deck" and waiting to be released enables short cycle times between driving successive screws.

Such a sequence of operations may be facilitated, according to an embodiment of the present invention, by providing the adaptor or screwdriver with one or more sensors, such as that shown at 120 in FIGS. 1, 2 and 7A that are configured to indicate the position of bit 706. Suitable sensors may be obtained from, for example, Keyence Corporation of America of Woodcliff Lake, N.J. For example, as soon as the sensor 120 detects that the bit 706 has been sufficiently retracted to enable a new screw to be released from the middle region 107 of the screw feeder tube, the sensor 120 may generate a signal that may be used to shut off (or substantially decrease the vacuum) within the screw feeder tube 104 to allow a new screw to be released into the screw holding assembly 108, 601.

Alternatively, or in addition to the functionality described above, as the bit 706 moves down towards the screw that is held at the screw holding assembly 108 or 601, a (e.g., proximity) sensor 120 may trigger and cause the vacuum generator to turn on. For example, in one embodiment, the sensor assembly may cause the vacuum generator to turn on when the screw is engaged by the screwdriver. Alternatively, the sensor assembly may cause the vacuum generator to turn on and draw another screw, upon detecting that a screw has been received at the distal end of the adaptor. In greater detail, the generated vacuum causes the next screw from the source of screws (e.g., a screw feeder) to travel towards the perforations 312 in the middle region 107 of the screw feeder tube 104. While the bit 706 is driving a screw, the sensor 120 may remain turned on, and the vacuum generator may continue to generate the vacuum within the screw feeder tube. Thus, the suction created by the vacuum generator holds the screw within the middle region 107 until it is needed. After the bit 706 retracts away from the screw holding assembly, the sensor 120 may turn off, thereby indicating that the bit 706 has cleared the screw path. The vacuum may then be turned off, and the screw previously held in the middle region 107 may then be released to travel (preferably solely under the force of gravity) to the screw holding assembly 108 or 601 for the next screw driving cycle.

FIG. 7A shows an electric screwdriver with automatic screw feeding functionality, according to another embodiment of the present invention. FIG. 7B shows a detail view of a portion of the electric screwdriver of FIG. 7A, with the first and second body portions 101, 102 removed therefrom, to show selected internal structures thereof. In one embodiment, a screwdriver may be coupled to a removable screw feeding adaptor, as described relative to FIGS. 1 to 6B. Alternatively, the electric screwdriver 702 may be provided with the automatic screw feeding functionality shown and described above, such that the functionality of the above-described adaptor forms an integral part of an electric screwdriver with automatic screw feeding.

The electric screwdriver shown in FIGS. 7A and 7B may be coupled to a vacuum generator and to a source of screws (e.g., a screw feeder), as described above. The electric screwdriver may then be hung from a support such as that shown at 706, to enable the electric screwdriver to be conveniently placed within easy reach of an operator, and to insure that the electric screwdriver is maintained in a substantially vertical orientation to facilitate the gravity feeding of the screws when the vacuum is turned off to release a screw.

As an operator-interface feedback mechanism, a sensor 116 (see FIGS. 1, 3, 6A and 7B) may also be attached to the screw feeder tube 104. The sensor 116 may be configured to detect the passage of a (e.g., metal) screw within the screw feeder tube 104. This sensor 116 may detect the presence of the screw and may, in turn, signal the operator to proceed with the next screw driving.

For example, the sensor 116 may be coupled to a light emitting diode (L.E.D), light bulb or sound source that is activated when a screw is detected in the screw feeder tube 104. For example, a lighted L.E.D. may signal to the operator to proceed to the next screw driving. Such an L.E.D. may advantageously be configured to turn off once the sensor is again triggered. In another embodiment, the sensor 120, used as described above to detect the location of a received and held screw, may also provide a signal to an operator of the location of the screw.

Figure 8:
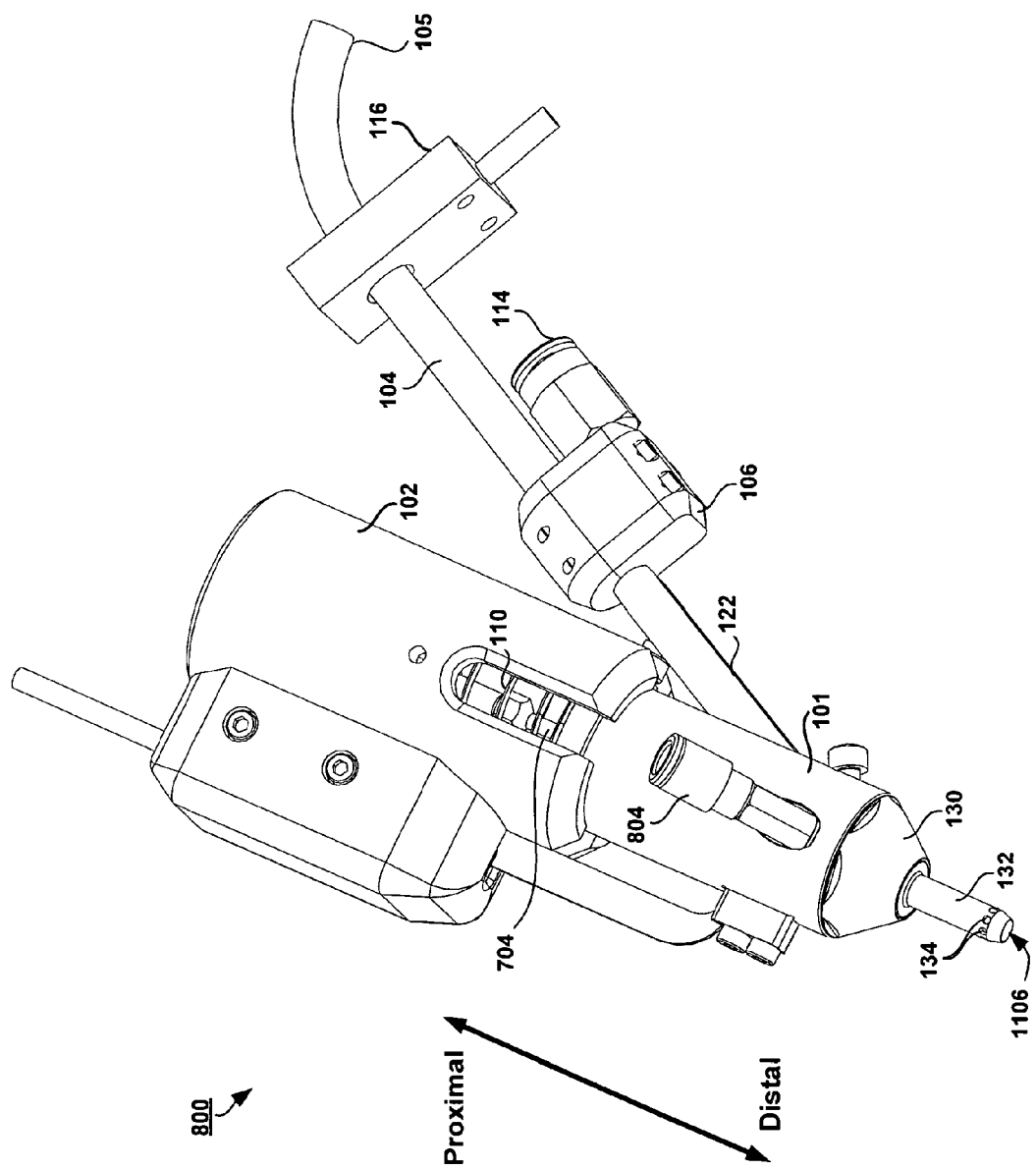
FIG. 8 shows an electric screwdriver assembly, according to another embodiment of the present invention.

FIGS. 8-16 show an electric screwdriver assembly according to another embodiment of the present invention. FIG. 8 shows a first perspective view of the electric screwdriver assembly, and FIG. 9 shows an exploded view thereof. As in the embodiments described relative to FIGS. 1-7B, the electric screwdriver assembly 800 may include a first body portion 101 and a second body portion 102. A screw feeder tube 104 (formed of or including polyurethane, for example) may be coupled to the first body portion 101. The first body portion 101 may define a portion of a screw conduit therethrough, which is best shown in FIGS. 11-16, at reference numeral 1102. The screw conduit 1102 has a proximal end 1101 within the first body portion 101 and a distal end 1106. The screw conduit 1102 includes a screw feeder opening 1104 that is spaced apart from the distal end 1106. A screw feeder tube 104 is coupled to the screw feeder opening 1104. As in the above-described embodiments, the screw feeder tube 104 is configured to allow screws (one of which is shown in FIGS. 11-16 at reference numeral 502) to pass through the screw feeder tube 104, through the screw feeder opening 1104 to the proximal end 1101 of the screw conduit 1102.

Figure 11:
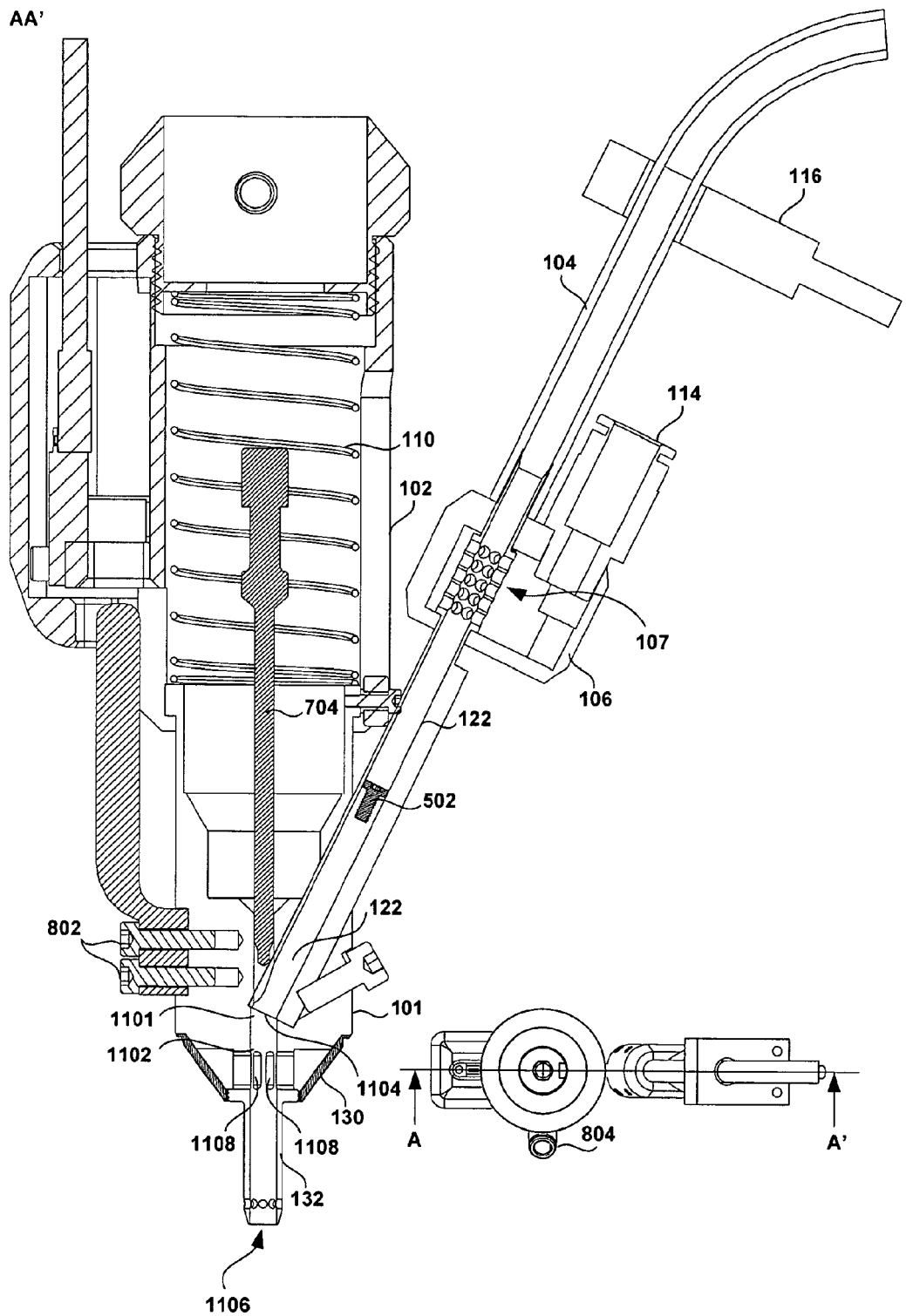
FIG. 11 is a top view and a cross-sectional view of the electric screwdriver assembly of FIG. 8, taken along cross-sectional line AA'.
Figure 14:
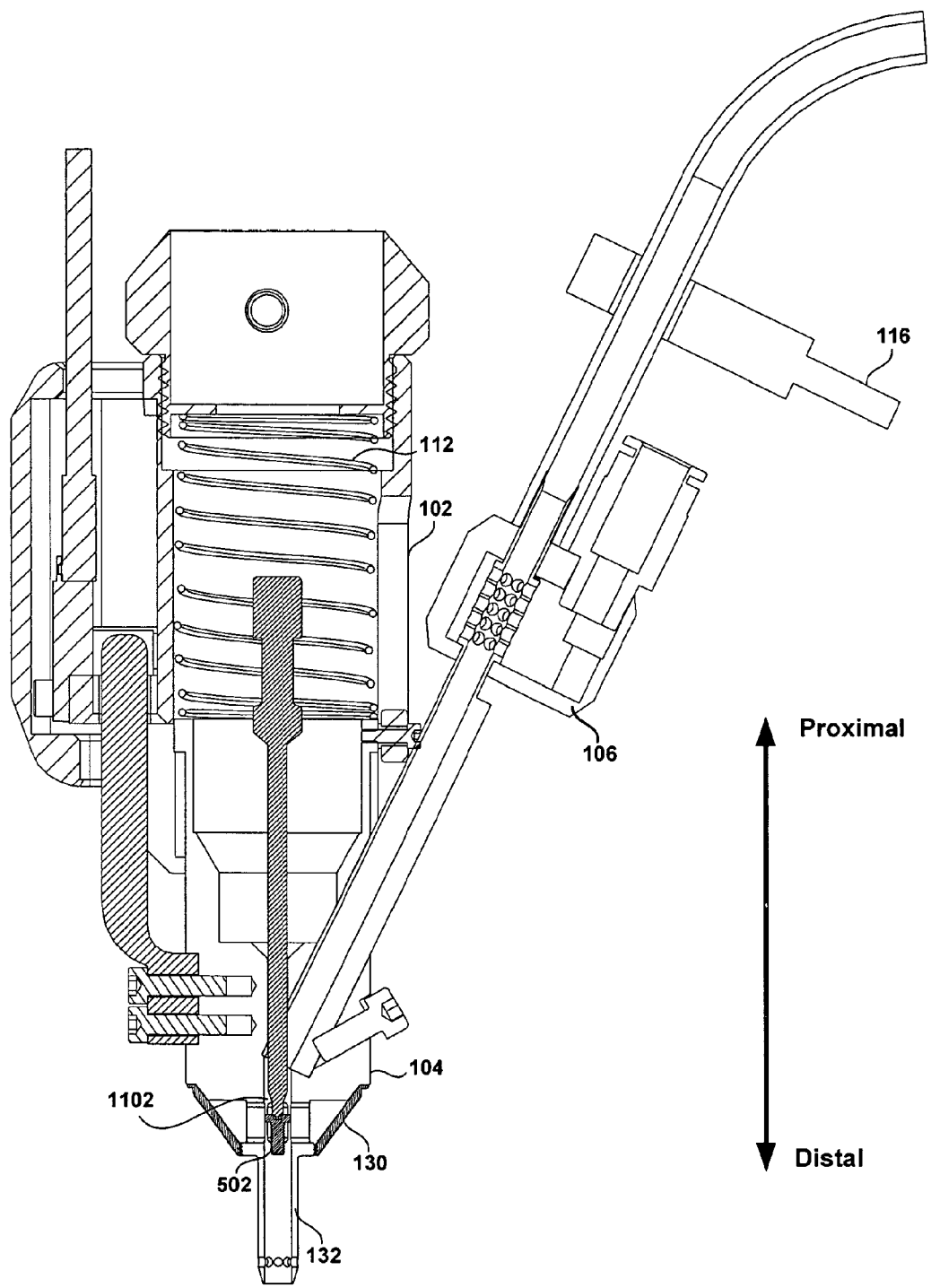
FIG. 14 shows the cross-sectional view of the electric screwdriver assembly of FIG. 8, to illustrate a screw held by a partial vacuum near the distal end thereof and engaged by a screwdriver bit.
Figure 15:
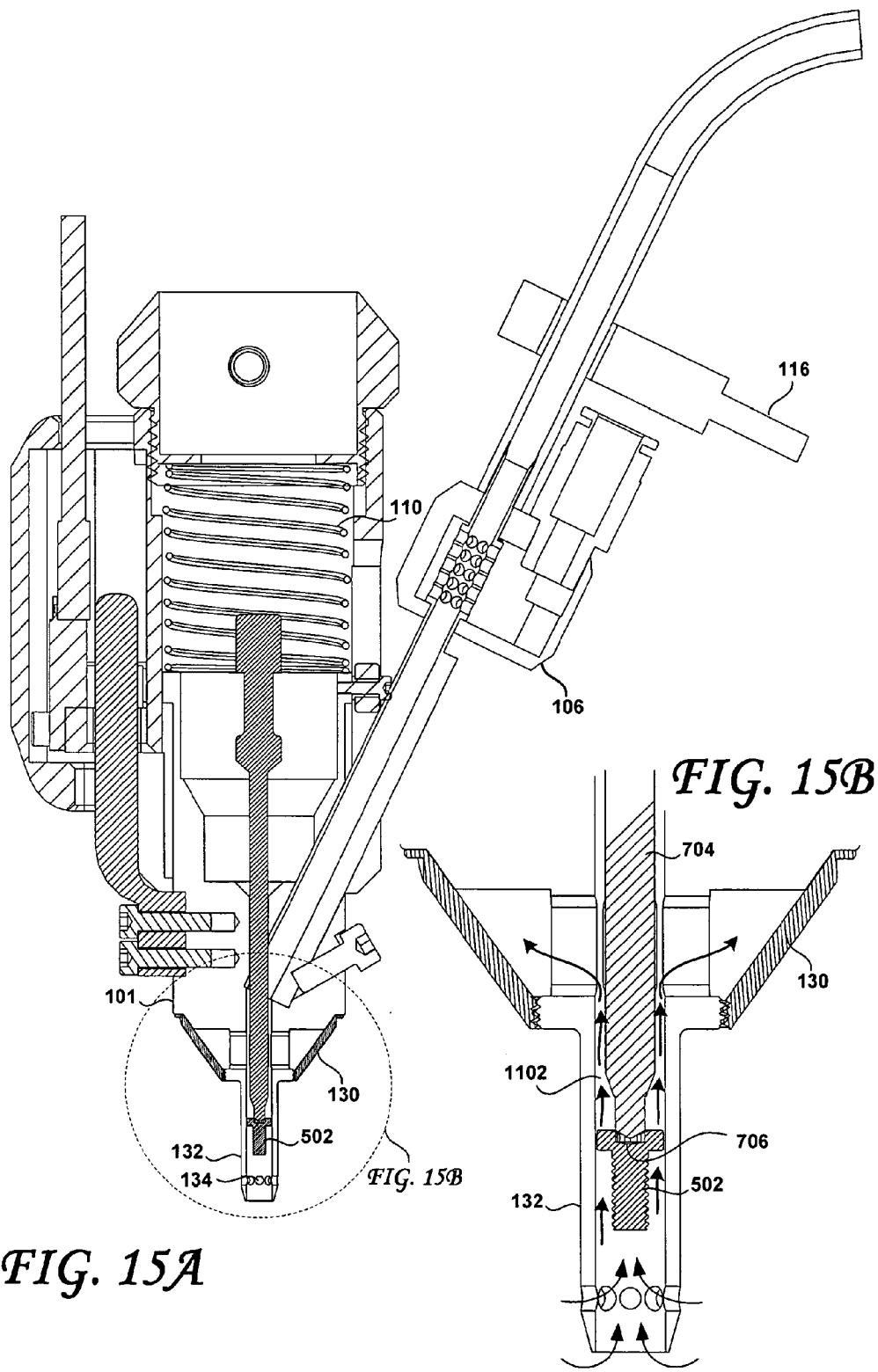
FIG. 15A shows the cross-sectional view of the electric screwdriver assembly of FIG. 8, to illustrate a screw acted upon by a partial vacuum and advanced in the distal direction by an advancing screwdriver bit.
FIG. 15B is a detail view of a portion of FIG. 15A, illustrating the manner in which airflow is channeled in and around the vacuum manifold and the engaged screw, according to embodiments of the present invention.
Figure 16:
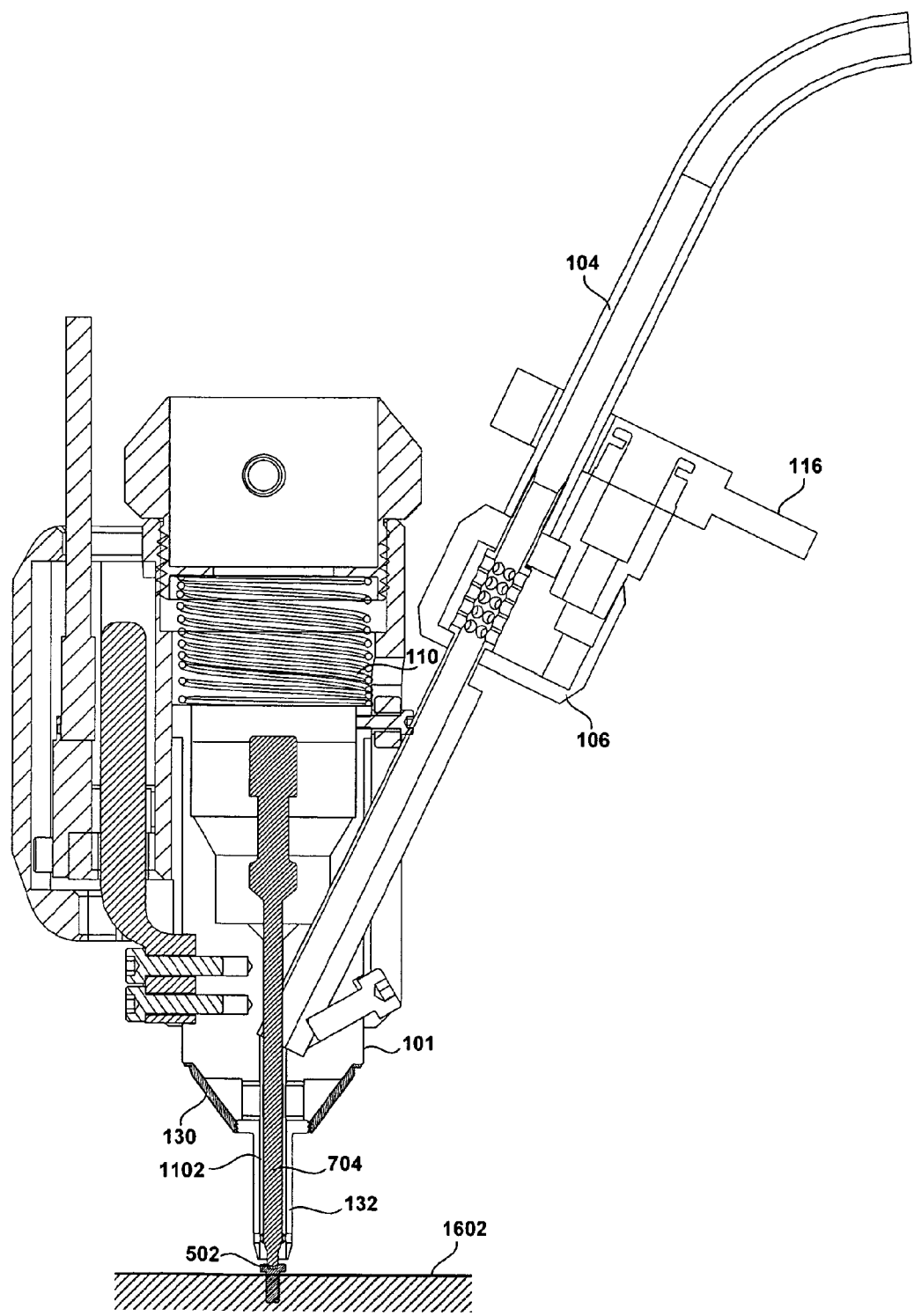
FIG. 16 shows the cross-sectional view of the electric screwdriver assembly of FIG. 8, to illustrate a screw being driven into a workpiece, according to embodiments of the present invention.

A screwdriver 704 (configured similarly to the screwdriver 704 discussed at length above) may be fitted within the first and second body portions 101, 102. The screwdriver 704 may be biased by a compression spring 110 fitted within the second body portion 102. The screwdriver 704 defines a free end facing the distal end 1106 of the screw conduit 1102. The free end of the screwdriver 704 defines a screwdriver bit 706, which is moveable between a position proximal (as shown in FIG. 11) from the screw feeder opening 1104 and a position distal from the screw feeder opening 1104 (as shown in FIGS. 14-16). The arrow in FIG. 8 shows the directional convention and defines the "proximal" and "distal" directions, as used throughout the present description. That is, the distal direction is towards the free end of the electric screwdriver assembly (i.e., toward the distal opening/distal end of the screw conduit 1106) and the proximal direction is away from the distal opening 1106). Following this convention, the distal end of a structure or passageway in the embodiments described herein is closer to the distal opening 1106 than is the proximal end thereof.

A vacuum generator (not shown) may be coupled to the middle region 107 of the screw feeder tube 104 by a vacuum bracket 106 disposed adjacent the middle region 107 of the screw feeder tube 104. The vacuum generator (which forms no part of the embodiments of the present invention described herein) may be configured to selectively generate a partial vacuum within the screw feeder tube 104 that is sufficient to draw a screw 502 from the proximal end 105 of the screw feeder tube 104 to the middle region 107 thereof. Once the screw 502 has been drawn by the partial vacuum within the screw feeder tube 104 to the middle region 107, the screw 502 may be allowed to fall within the screw feeder tube 104, under the action of the force of gravity, toward the screw feeder opening 1104 of the screw conduit 1102, as shown in the cross-sectional view of the electric screwdriver assembly of FIG. 11. To do this, the vacuum generator may be turned off or the partial vacuum may be made momentarily weaker, thereby allowing the screw 502 drawn to the middle region 107 of the screw feeder tube 104 to fall toward the screw feeder opening 1104 under the force of gravity alone. In use, the electric screwdriver assembly 800 is preferably oriented such that the screwdriver 704 is disposed substantially vertically so as to allow screws 502 to fall freely from the middle region 107 of the screw feeder tube 104 toward the screw conduit 1102. When the vacuum generator generates the partial vacuum, the flow of air is directed from the proximal end 105 of the screw feeder tube 104 toward the middle region 107 thereof and from the distal opening 1106 through the screw conduit 1102 and through the screw feeder tube 104 to the middle region 107 thereof.

Figure 10:
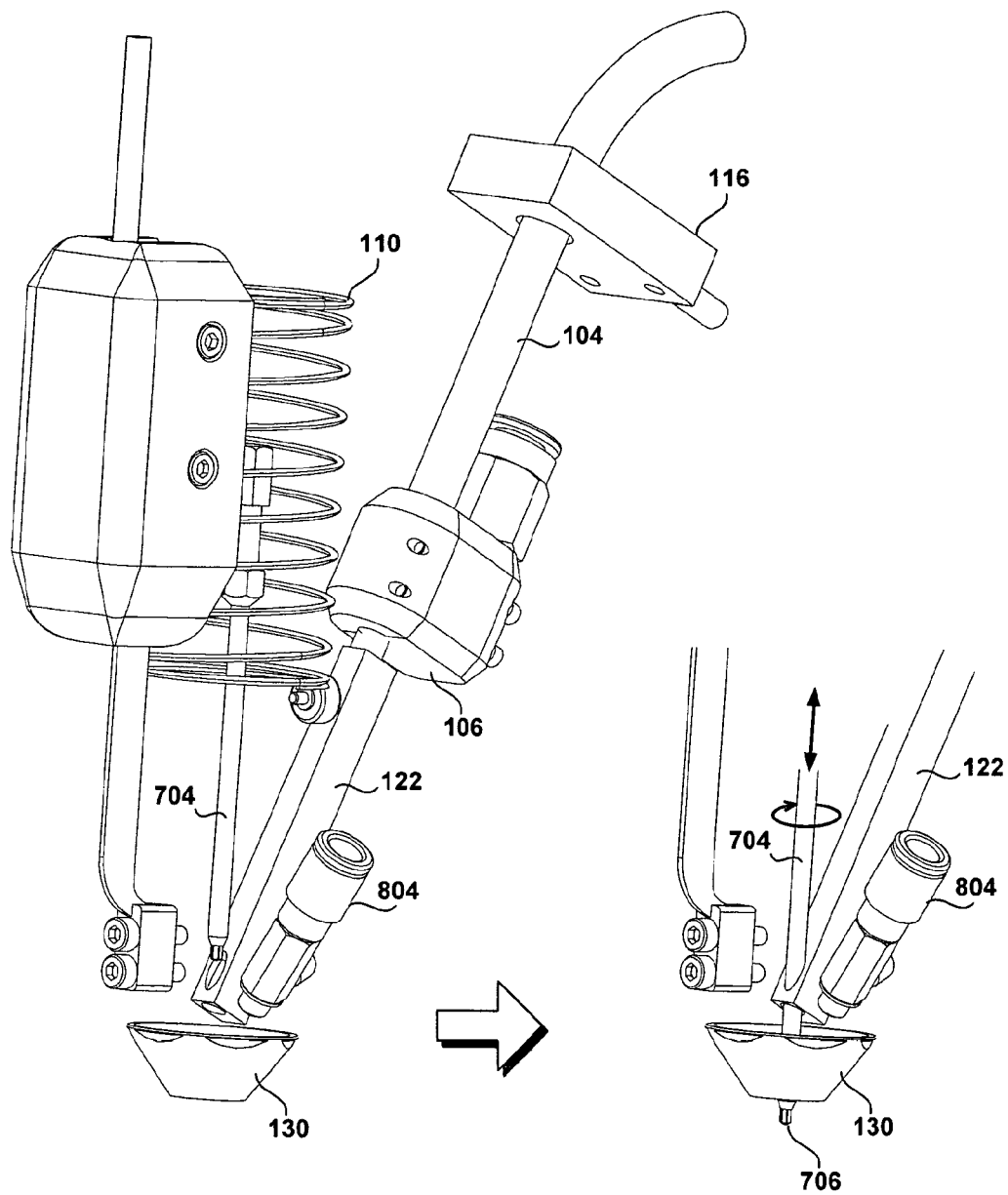
FIG. 10 shows the electric screwdriver assembly of FIG. 8 with the first and second body portions removed therefrom, to show some of the internal structure and operation thereof.

FIG. 10 shows the electric screwdriver assembly of FIG. 8 with the first and second body portions removed therefrom, to show some of the internal structure and operation thereof. As shown, a screw feeder tube fitting 122 may be coupled to the distal portion of the screw feeder tube 104. The screw feeder tube fitting 122 may be coupled to the first body portion 101 to couple the screw feeder tube 104 to the first body portion 101, so that the distal free end of the screw feeder tube 104 can feed a screw 502 to the proximal end 1101 of the screw conduit 1102. As shown in FIG. 10, the screwdriver 704 may be operative to move from a first position in which the screwdriver bit 706 is proximal to the screw feeder opening 1104 (as shown in the left hand side of FIG. 10 and in FIG. 11) to a second position in which the screwdriver bit 706 is distal to the screw feeder opening 1104 (right hand side of FIG. 10 and FIGS. 14-16). As also shown in FIG. 10, the screw feeder tube fitting 122, fitted to the first body portion 101 at an angle, may also define a through bore through which the screwdriver bit 706 and the screwdriver may freely move up and down and rotate, as suggested by the right hand side of FIG. 10.

As shown in FIGS. 8-16, the electric screwdriver assembly according to embodiments of the present invention may include a manifold cover 130 coupled to the first body portion 101. The screw conduit 1102 may also define one or more openings 1108 (best shown in FIGS. 9 and 11-12). The openings 1108 are spaced apart from the distal end 1106 of the screw conduit 1102. As best shown in FIGS. 11-16, the electric screwdriver assembly may include a manifold cover 130 that surrounds the opening or openings 1108 and creates a space within which a partial vacuum may be generated. According to an embodiment of the present invention, the manifold cover 130 may be threaded onto the first body portion 101. Threading the manifold cover 130 onto the first body portion 101 reduces the number of parts, reduces the generation of potentially harmful particulate matter, and forms an airtight seal around the body portion 101. As shown in FIGS. 8-9 and 11-16, a retainer extension 132 may be coupled to the manifold cover 130. The retainer extension 132 defines a screw passageway that is aligned with and forms a distal portion of the screw conduit 1102. The retainer extension 132 terminates in the distal opening 1106 at the distal end of the screw conduit 1102. The retainer extension 132 is preferably shaped so as to maintain alignment of the screw 502 as the screw 502 is acted upon by the partial vacuum and engaged by the screwdriver bit 706, as described below. As shown in FIG. 8, the retainer extension 132 may define one or more side openings 134 that are spaced proximally apart from the distal opening 1106.

Figure 12:
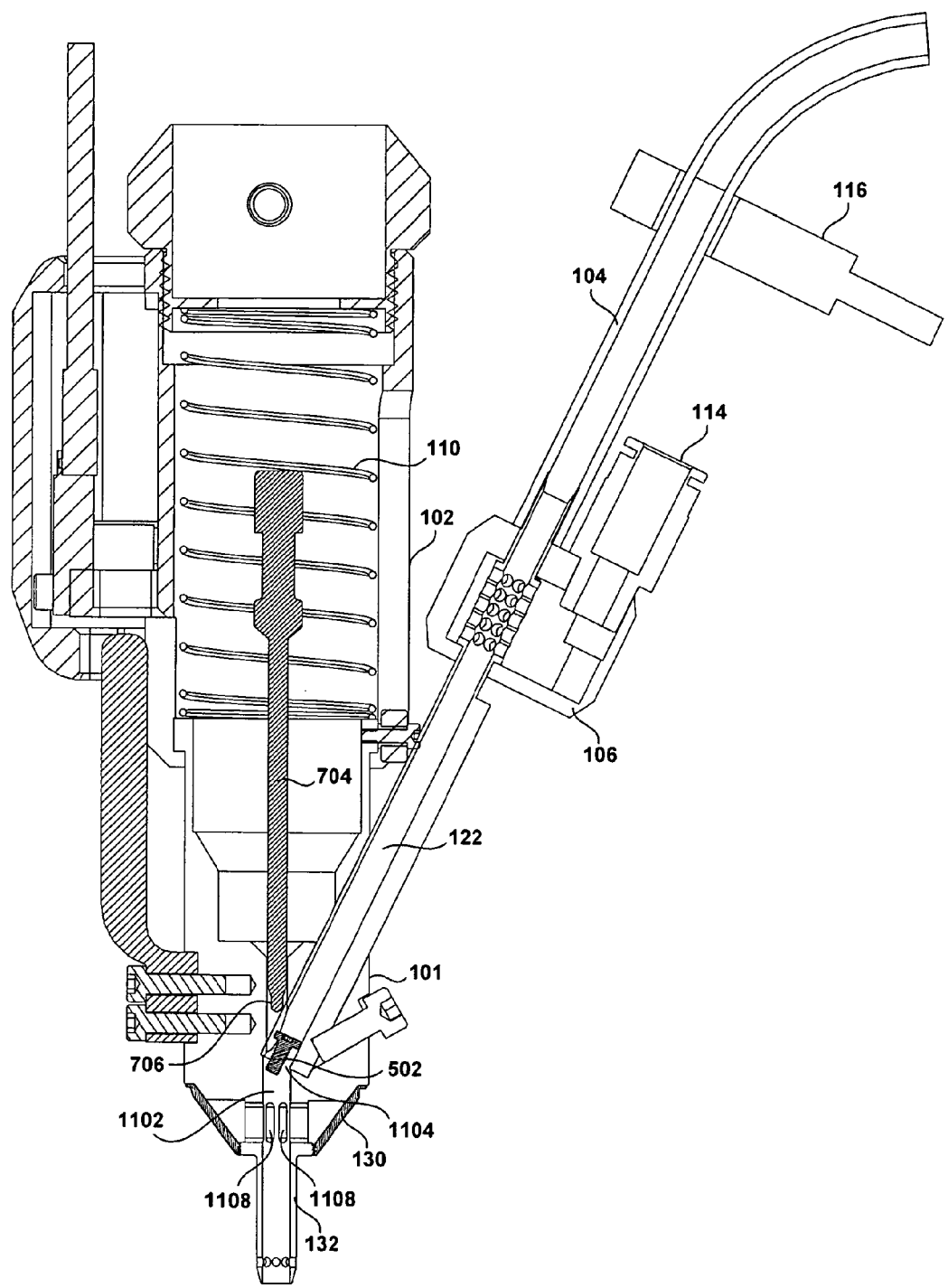
FIG. 12 shows the cross-sectional view of the electric screwdriver assembly of FIG. 8, to illustrate further aspects of the operation thereof.

Aspects of the operation of the present electric screwdriver assembly according to embodiments of the present invention are described hereunder relative to FIGS. 11-16. The operation of the present electric screwdriver assembly, according to an embodiment of the present invention, may begin by providing a screw to the screw conduit 1102. To do so, a screw may be engaged by the automatic screw feeding adaptor, which screw feeding adaptor may include, without limitation, the screw feeder tube 104, the fitting 122 and all components necessary for generating a partial vacuum within the screw feeder tube 104 and within the screw conduit 1102. Such components may include, for example, the vacuum bracket 106, the bracket fitting 114 and the vacuum generator (not shown). In other embodiments, the vacuum generator may be understood to comprise a component or components that are separate from the rest of the electric screwdriver assembly. A sensor 116 may be provided for sensing the passage of screws 502 within the screw feeder tube 104. In operation, a screw 502 may be drawn from the proximal end 105 to the middle region 107 of the screw feeder tube 104 by the force exerted thereon by a middle partial vacuum generated at the middle region 107 of the screw feeder tube 104. The middle partial vacuum may then be shut off or diminished sufficiently to allow the screw 502 to fall from the middle region 107 of the screw feeder tube 104 to the distal end thereof. As the electric screwdriver assembly, in use, is oriented such that the screwdriver 704 is oriented vertically or substantially vertically, when the middle partial vacuum is shut off or diminished, the screw 502 is released to fall within the screw feeder tube 104 from the middle region 107 towards the distal end thereof under the force of gravity, as shown at FIG. 11. As shown in FIG. 12, the screw 502 travels within the screw feeder tube 104 until it reaches the screw feeder opening 1104 and enters the screw conduit 1102 within the first body portion 101.

Unlike previously described embodiments, the embodiment of FIGS. 8-16 need not rely upon a mechanical screw holding assembly 108 to hold the screw in position for engagement by the screwdriver bit 706—although the use of such a mechanical screw holding assembly is not incompatible with the embodiments of FIGS. 8-16. Instead, according to an embodiment of the present invention, as the screw 502 approaches the openings 1108 of the screw conduit 1102, a distal partial vacuum may be generated within the space around the openings 1108 and surrounded by the manifold cover 130. A distal partial vacuum fitting 804 (shown in FIGS. 8, 9, 10 and 11) may be provided, to enable a vacuum line to be coupled thereto. The generation of the distal partial vacuum may be timed so as to coincide with the imminent approach of the falling screw 502 to the openings 1108 within the screw conduit 1102. Alternatively, this distal partial vacuum may be "always on" during operation of the screwdriver assembly. Sensors, such as shown at 802 (best seen in FIG. 11), may facilitate detection of the falling screw 502 near the openings 1108, and a detection of a falling screw 502 may be used to trigger the generation of the distal partial vacuum, although other means and methods may be used, as those of skill may appreciate.

Figure 13:
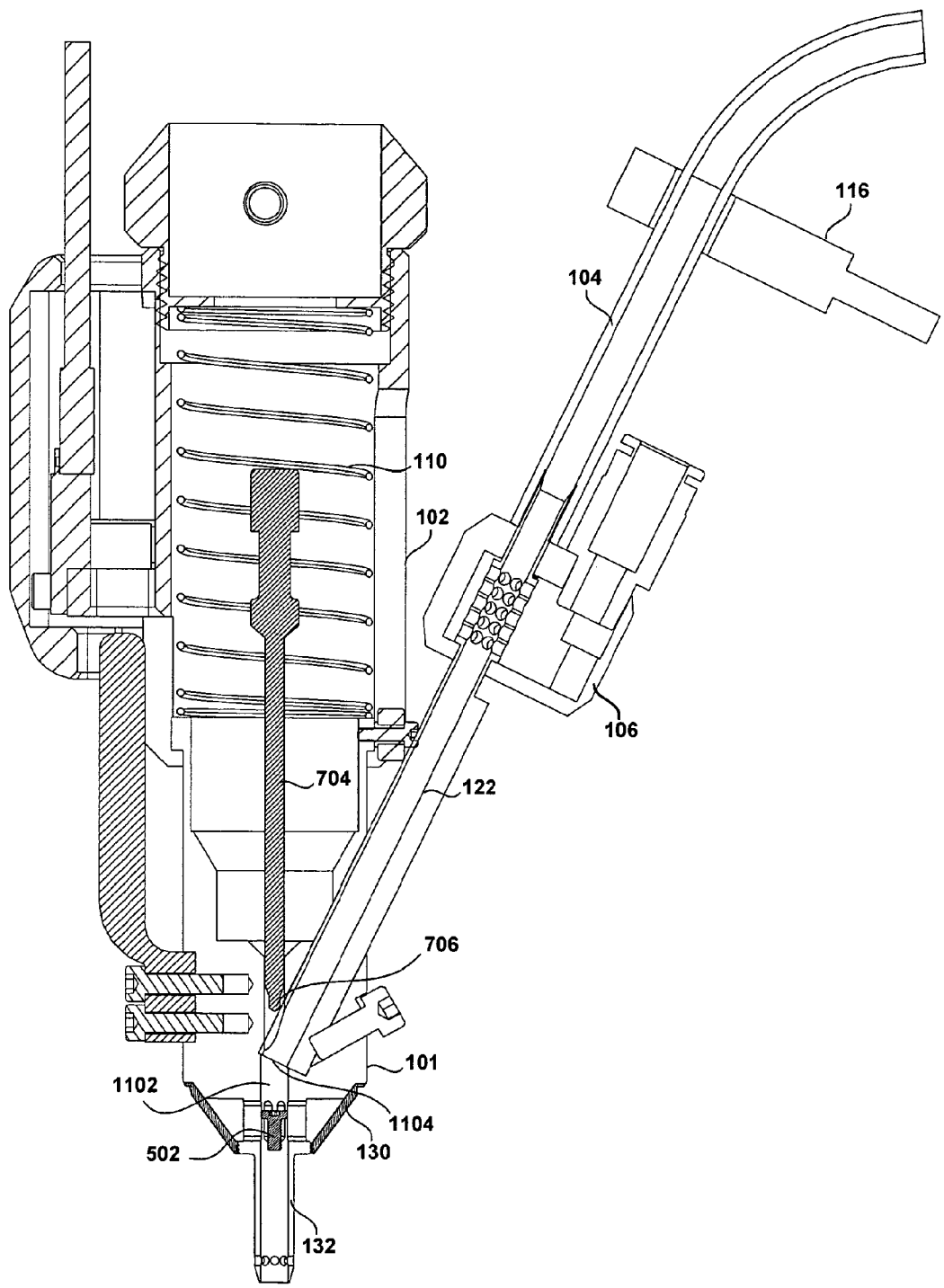
FIG. 13 shows the cross-sectional view of the electric screwdriver assembly of FIG. 8, to illustrate a screw being held by a partial vacuum near the distal end thereof.

In any event, the distal partial vacuum may then generate a force on the screw 502 that is sufficient to arrest the screw's fall and to hold it at or near the openings 1108, for example, in one embodiment, roughly aligned with the openings 1108, as is shown at FIG. 13. The screw 502 may be considered substantially or roughly aligned with the openings 1108 if the head of the screw 502 (i.e., the portion of the screw 502 that is engaged by the screwdriver bit 706) is at or near the openings 1108 along the distal-proximal axis. In one embodiment, the screw 502 is substantially aligned with the openings 1108 if the head of the screw 502 is within one screw length of the openings 1108 along the distal-proximal axis. Indeed, as shown in FIG. 13, the distal partial vacuum may hold the head of the screw 502. at approximately the middle of the openings 1108, with the threaded shaft portion of the screw 502 extending in the distal direction, and aligned roughly along a longitudinal axis that is substantially parallel to the longitudinal axis of the screwdriver 704.

As shown therein, the distal partial vacuum may be sufficient to hold the screw within the screw conduit 1102 without mechanical support, solely by a force imposed upon the screw by the distal partial vacuum. In this position, the screw 502 is held in a position that is suitable for engagement by the screwdriver bit 706. As shown in FIG. 14, the spring 110 may then be compressed, driving the screwdriver bit 706 in the distal direction to engage the screw 502. The distal partial vacuum is maintained while the screwdriver bit 706 engages the screw 502. The distal partial vacuum may also be maintained (thereby maintaining a force directed in the proximal direction on the screw and maintaining the screw 502 pressed against the screwdriver bit 706) as the screwdriver bit 706 advances the engaged screw 502 through the screw conduit 1102 formed by the retainer extension 132, as shown at FIG. 15A. FIG. 15B is an enlarged view of a detail of FIG. 15A and shows the proximally-directed airflow generated by the distal partial vacuum within the screw conduit 1102, which tends to maintain the screw 502 against the screwdriver bit 706 during the engagement and driving of the screw. Thereafter and as shown in FIG. 16, the spring 110 may be further compressed, further driving the screwdriver bit 706 in the distal direction, until the engaged screw at least partially emerges from the distal end 1106 of the screw conduit 1102. When the screw 502 at least partially emerges from the screw conduit 1102, it may be driven into, for example, a correspondingly threaded bore within a workpiece 1602.

According to an embodiment of the present invention a single vacuum generator may generate the proximal and distal partial vacuums. Such a single vacuum generator may be fitted to both vacuum fittings 804 and 114. Alternatively, each of the vacuum fittings 804 and 114 may be coupled to a separate vacuum generator. Advantageously, one embodiment of the electric screwdriver assembly may not generate significant airflow in the distal direction (such as occurs when a blow screw feeding system is employed), which airflow could contaminate the workpiece and the area around the screwdriver assembly with undesirable particulates (from the screw 502, for example). Particulate contamination of the workpiece into which screws are to be driven may also be reduced through the use of the distal partial vacuum to hold the screw during engagement thereof by the screwdriver bit 706. As compared to embodiments using a mechanical screw holding assembly, the embodiments described relative to FIGS. 8-16 may also reduce the metal-to-metal contact of the screw during engagement with the bit 706 and minimize the number of moving parts necessary to hold the screw prior to and during engagement of the screw with the screwdriver bit 706. Moreover, the airflow induced at the distal opening 1106 may draw particulate matter in, in effect cleaning the surface of the workpiece 1602 immediately adjacent to the bore into which the screw 502 is to be driven. Another screw may be drawn into the screw feeder tube by the proximal partial vacuum while the screw 502 is held at the distal end of the screw conduit 1102 and driven by the screwdriver bit 706. Moreover, the sensor 802 may also generate an alert when the screw 502 is held at or near the distal end of the screw conduit 1102.

Advantageously, embodiments of the present invention may reduce the need to pick screws manually from a shaker tray, as well as the need for an intermediate screw-presenting device between the source of screws and the screwdriver. An operator may need only to perform an up and down screw-driving motion, as the screwdriver need not be swung over to the source of screws to pick up the next screw to be driven, which results in a faster screw driving cycle time and higher manufacturing line yields as compared with conventional pick-and-screw-driving methods. Moreover, as the embodiments described herein do not rely on a blow feeding system in which distally-directed airflow is used to transport screws to the screwdriver bit (relying instead primarily on suction and gravity to feed screws), embodiments of the present invention are ideally suited to clean room manufacturing environments. In fact, as the screws are fed by a combination of suction and gravity, substantially no air flow may be present out of the distal end of the adaptor or screwdriver, which further reduces the contamination of the surrounding environment, as compared with conventional blow fed systems in which blasts of air are emitted from the distal end of the screwdriver. Regular cleaning of the adaptor (the adaptor including all of the structures and functionality shown in and described relative to FIGS. 8-16, except for the screwdriver 704) or electric screwdriver assembly via the vacuum bracket fitting 114 of the present adaptor or screwdriver also reduces the amount of particulate matter or other impurities that may accumulate within the adaptor or screwdriver over time and potentially contaminate the surrounding environment.

As noted above, embodiments of the present invention may be readily adapted to automatic screw driving stations that do not require a human operator. When embodiments of the present invention are adapted to automated screw driving stations, the cycle time for such automated machines also decreases, thereby increasing their yield. When embodiments of the present invention are incorporated into such automatic screw driving stations, the design thereof may be simplified and the cost reduced, as the robotic apparatus need no longer provide for picking up screws from a shaker tray.

I claim:

1. An electric screwdriver assembly, comprising:
   a body portion, the body portion defining a screw conduit therethrough, the screw conduit having a distal end and at least one opening spaced apart from the distal end;
   a screwdriver disposed within the body portion including a free end facing the distal end of the screw conduit that defines a screwdriver bit, the screwdriver bit moveable through the screw conduit between a position proximal from the at least one opening and a position distal from the at least one opening, and
   a vacuum coupling assembly configured to couple a vacuum generator to the body portion in order to generate a partial vacuum within the screw conduit through the at least one opening to substantially align the screw with the at least one opening.

2. The electric screwdriver assembly of claim 1, further comprising a manifold cover coupled to the body portion, the manifold cover surrounding the at least one opening and creating a space within which the partial vacuum is generated.

3. The electric screwdriver assembly of claim 2, wherein the manifold cover is threaded onto the body portion.

4. The electric screwdriver assembly of claim 1, further including a compression spring fitted within the body portion, the compression spring biased to move the screwdriver bit proximally away from the at least one opening.

5. An electric screwdriver assembly, comprising:
   a body portion, the body portion defining a screw conduit therethrough, the screw conduit having a proximal end, a distal end and a screw feeder opening spaced apart from the distal end;
   a screw feeder tube coupled to the screw feeder opening, configured to allow screws to pass through the screw feeder tube and screw feeder opening, and
   a first vacuum coupling assembly configured to couple to a first vacuum generator in order to generate a first partial vacuum within the screw feeding tube sufficient to draw a screw from a proximal region of the screw feeding tube to a middle region thereof;
   a screwdriver disposed within the body portion including a free end facing the distal end of the screw conduit that defines a screwdriver bit, the screwdriver bit moveable between a position proximal from the screw feeder opening and a position distal from the screw feeder opening.

6. The electric screwdriver assembly of claim 5, further including a second vacuum coupling assembly configured to couple a second vacuum generator to the body portion in order to generate a second partial vacuum within the screw conduit.

7. The electric screwdriver assembly of claim 6, wherein the screw conduit further comprises at least one opening spaced between the distal end and the screw feeder opening, such that the second partial vacuum may be generated within the screw conduit through the at least one opening.

8. The electric screwdriver assembly of claim 7, further including a vacuum manifold coupled to the body portion, the vacuum manifold surrounding the at least one opening and creating a space within which the second partial vacuum is generated.

9. The electric screwdriver assembly of claim 8, wherein the vacuum manifold is threaded onto the body portion.

10. The electric screwdriver assembly of claim 5, wherein the screw feeder tube is configured such that screws pass through at least part of the screw feeder tube and screw feeder opening under the force of gravity.

11. The electric screwdriver assembly of claim 5, wherein the screw conduit further comprises at least one opening spaced between the distal end and the screw feeder opening, such that a second partial vacuum may be generated through the at least one opening.

12. The electric screwdriver assembly of claim 5, further including a compression spring fitted within the body portion, the compression spring being biased to move the screwdriver bit toward the proximal end of the screw conduit.

13. The electric screwdriver assembly of claim 5, further including a mechanical screw catchment at the distal end of the screw conduit.

\* \* \* \* \*